US010821655B2

(12) United States Patent
Schiariti et al.

(10) Patent No.: US 10,821,655 B2
(45) Date of Patent: Nov. 3, 2020

(54) MANUFACTURING PROCESS FOR MAKING A DOME ELEMENT PROVIDED WITH THERMAL PROTECTION FOR A SOLID PROPELLANT ROCKET ENGINE

(71) Applicant: AVIO S.P.A., Rome (IT)

(72) Inventors: Daniele Schiariti, Rome (IT); Massimiliano Cardelli, Rome (IT)

(73) Assignee: AVIO S.P.A., Rome (IT)

( * ) Notice: Subject to any disclaimer, the term of this patent is extended or adjusted under 35 U.S.C. 154(b) by 65 days.

(21) Appl. No.: 16/199,657

(22) Filed: Nov. 26, 2018

(65) Prior Publication Data
US 2019/0160727 A1 May 30, 2019

(30) Foreign Application Priority Data

Nov. 27, 2017 (IT) .......................... 102017000135747

(51) Int. Cl.
B29C 53/60 (2006.01)
F02K 9/34 (2006.01)
B05D 3/14 (2006.01)
B05D 5/00 (2006.01)
B29C 59/14 (2006.01)
F02K 9/97 (2006.01)
B05B 13/04 (2006.01)
(Continued)

(52) U.S. Cl.
CPC .......... *B29C 53/602* (2013.01); *B05D 3/142* (2013.01); *B05D 5/00* (2013.01); *B29C 59/14* (2013.01); *B29C 59/142* (2013.01); *F02K 9/346* (2013.01); *F02K 9/974* (2013.01); *B05B 13/0457* (2013.01); *B05D 1/02* (2013.01); *B05D 7/58* (2013.01); *B05D 2202/00* (2013.01); *B29C 70/025* (2013.01); *B29C 2053/8025* (2013.01); *B29C 2059/145* (2013.01); *B29L 2031/3097* (2013.01); *F05D 2230/30* (2013.01)

(58) Field of Classification Search
CPC ...... B05D 3/142; B05D 2202/00; B05D 1/02; B05D 7/58; B05D 5/00; B29L 2031/3097; B29C 2053/8025; B29C 59/14; B29C 53/602; B29C 70/025; B29C 59/142; F05D 2230/30; B05B 13/0457; F02K 9/346
See application file for complete search history.

(56) References Cited

U.S. PATENT DOCUMENTS 5,236,636 A 8/1993 Tisack
2006/0073282 A1* 4/2006 Bourdoncle ............ F02K 9/346
427/372.2

FOREIGN PATENT DOCUMENTS

DE 10 2009 052088 A1 5/2011
EP 1319823 A2 6/2003

OTHER PUBLICATIONS

Kai Frode Grythe et al., Adhesion in Solid Propellant Rocket Motors, The Journal of Adhesion, vol. 83, No. 3, Mar. 8, 2007, pp. 223-254.

* cited by examiner

Primary Examiner — Vishal I Patel
(74) Attorney, Agent, or Firm — McGlew and Tuttle, P.C.

(57) ABSTRACT

For producing a dome-shaped element (2) provided with thermal protection for a solid propellant rocket engine, a coupling annular body (4) is arranged in a mold (5) and has a surface (20) that is clean and activated, by an atmospheric-pressure plasma treatment, before depositing a primer layer (26) and an adhesive layer (27) on the surface (20); ablative (Continued)

material is then automatically applied to the adhesive layer and to an area (17) of the mold (5) so as to form a series of superimposed layers (30).

8 Claims, 6 Drawing Sheets

(51) Int. Cl.
*B05D 1/02* (2006.01)
*B29C 70/02* (2006.01)
*B29L 31/30* (2006.01)
*B05D 7/00* (2006.01)
*B29C 53/80* (2006.01)

MANUFACTURING PROCESS FOR MAKING A DOME ELEMENT PROVIDED WITH THERMAL PROTECTION FOR A SOLID PROPELLANT ROCKET ENGINE

TECHNICAL FIELD

The present disclosure relates to a method for producing a dome-shaped element provided with thermal protection for a solid propellant rocket engine.

BACKGROUND ART

Solid propellant rocket engines typically comprise an axial-symmetrical outer casing, which houses a charge of solid propellant, with an ignition system provided at an end of the casing and an end nozzle provided at the opposite end. The casing is internally coated with a thermal protection made of ablative material, typically constituted by elastomers charged with additives and/or fibers, to protect the casing inner surface against high temperatures and erosion.

Different technologies can be used to provide the thermal protection. In EP1319823, for example, the thermal protection is formed by winding a web of reinforced ablative material on the outer surface of a mandrel, having a cylindrical intermediate portion and two end domes, opposite to each other. The casing is made of composite material and is formed above the thermal protection after this latter has been vulcanized.

According to a different embodiment, the thermal protection is constituted by a cylindrical intermediate part, which is formed on the cylindrical portion of the mandrel analogously to what described above, and two dome-shaped end parts are formed "out of the site of assemblage", i.e. separately from the mandrel, and are then mounted thereon.

In particular, an element is formed "out of the site of assemblage" constituted by the ablative material and by a metal annular body, commonly known as "polar boss", i.e. polar end flange, which acts as a connection for fixing the nozzle or the ignition device to the casing. In particular, this production method comprises the following steps:
  cleaning by blasting the surfaces of the polar boss, to which the ablative material will be coupled;
  manually applying, by means of a brush, a primer layer to these surfaces, and verifying that the primer layer thickness meets the requirements;
  manually applying, by means of a brush, an adhesive layer to the primer layer, and verifying that the adhesive layer thickness meets the requirements;
  arranging the polar boss in a mold;
  manually putting a series of sheets of ablative material over the applied adhesive layer, so as to define, as a whole, the thermal protection;
  manually positioning a so-called floater insert, i.e. an elastomer component, which acts as virtual hinge, and at least a layer of a so-called releasing material, i.e. an anti-adhesion material, for example a PTFE layer, on the thermal protection;
  manual applying a series of sheets of ablative material to the floater insert and the releasing material, so as to form, as a whole, a so-called relief flap or floater, which will remain coupled to the underlying thermal protection along an outer annular edge coinciding with the virtual hinge defined by the floater insert; in this way, the stress relief flap can move towards and away from the thermal protection in order to avoid stresses caused by shrinking of the solid propellant during the consolidation thereof after casting in the casing;
  generating vacuum through the mold to compact the various layers of ablative material;
  vulcanizing the ablative material, maintaining the vacuum, for example in a pressure vessel.

A need for improving the above described solution exists, in particular to optimize the polar boss cleaning operations and the adhesion properties between the ablative material and the polar boss.

Furthermore, a need exists for reducing the times of the process, and for improving and making consistent the quality thereof with regard to the application of the layers of primer, adhesive and ablative material.

SUMMARY

The object of the embodiments of the present disclosure is to provide a method for producing a dome-shaped element provided with thermal protection for a solid propellant rocket engine, which allows to meet the needs described above simply and inexpensively.

According to the present disclosure, a method is provided for producing a dome-shaped element provided with thermal protection for a solid propellant rocket engine, comprising the step of providing a coupling annular body and arranging said coupling annular body in a mold. Once the coupling annular body has been placed in the mold, a surface of the coupling annular body can be subjected to a treating step including at least one of a surface cleaning step and a surface activation step. Onto the treated surface, at least an intermediate fixing layer can be applied, followed by the application of ablative material to the intermediate fixing layer and to a side area of said mold, for instance in form of subsequent layers. In embodiments of the present disclosure, the step of treating said surface comprises a treatment with atmospheric-pressure plasma.

The present disclosure also relates to a station for producing a dome-shaped element provided with thermal protection. In embodiments disclosed herein the station includes a mold and a robot comprising a movable head. The station can further include device for atmospheric-pressure plasma treatment, carried by said movable head.

BRIEF DESCRIPTION OF THE DRAWINGS

Various aspects of the invention will be described below with reference to the accompanying drawings, which illustrate a non-limiting exemplary embodiment. In the drawing.

DETAILED DESCRIPTION

Figure 1:
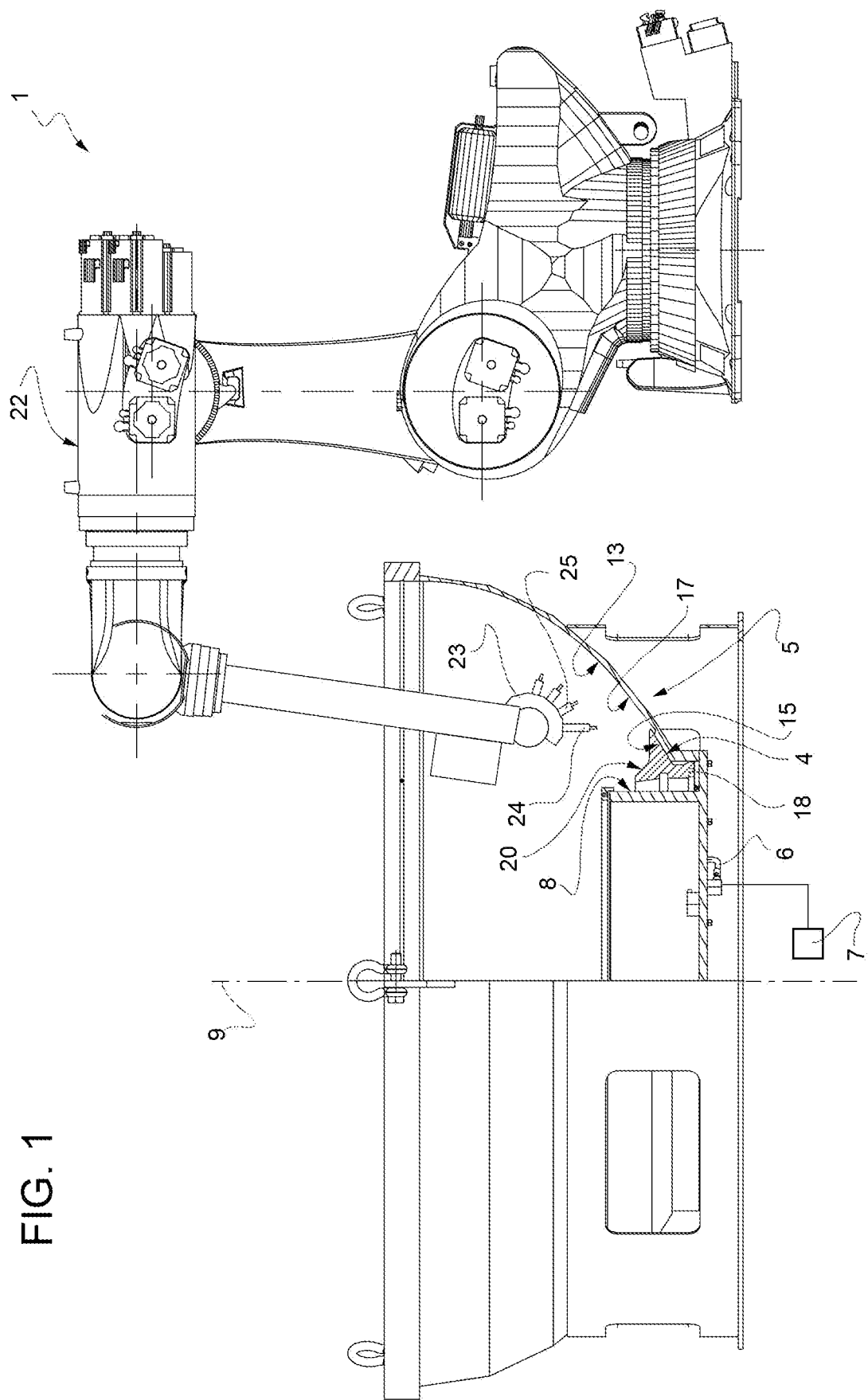
FIG. 1 is a side view showing, with some parts in cross-section and some parts schematized, an operating step of a preferred embodiment of the method for producing a dome-shaped element according to the present disclosure.
Figure 6:
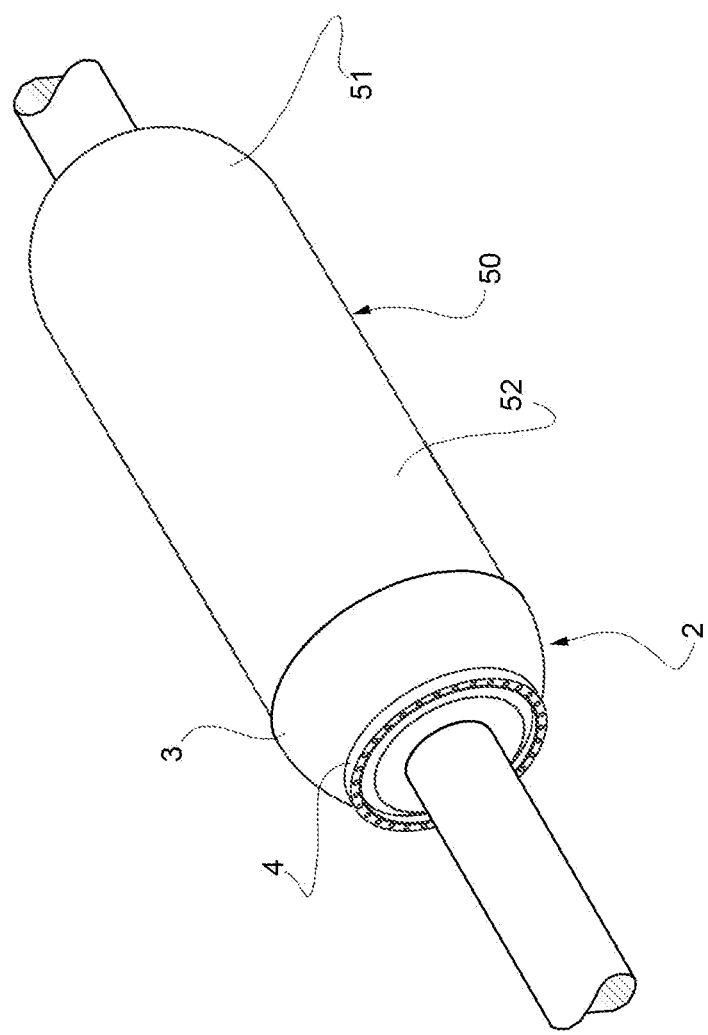
FIG. 6 shows the dome-shaped element produced according to the method of FIGS. 1-5 and mounted on an axial end of a mandrel to make a casing of a solid propellant rocket engine.

In FIG. 1, reference number 1 indicates a station (shown in simplified manner and with schematized parts) for producing a dome-shaped element 2, visible in FIG. 6 and comprising a thermal protection element 3. The latter defines an end portion of an inner thermal protection coating, which is provided in a casing (not shown) of a solid propellant rocket engine. The thermal protection is defined by an ablative material, typically constituted by elastomers charged with additives and/or fibers, to protect the internal surface of the casing against high temperatures and erosion during the combustion of the propellant. As shown in FIG. 6, the dome-shaped element 2 also comprises an annular connection body 4, which is commonly called polar boss and acts as a connection for fixing a nozzle or an ignition device (not shown) to the casing.

With reference to FIG. 1, the station 1 comprises a mold 5, preferably made of metal, with such constructive characteristics that the thermal expansion thereof is within preset limits, in order to have high precision as regards the external shape and dimensions of the thermal protection element 3. Advantageously, the mold 5 has at least one pneumatic socket 6 connected to at least one vacuum pump 7 (schematically illustrated).

The mold 5 delimits a seat 8, which is shaped like a ring about an axis 9, preferably arranged vertically, and comprises a lower area having such a shape and dimensions as to house the body 4. In particular, with reference to FIG. 2, the seat 8 is defined: axially by a bottom face 11; radially inwardly by a preferably cylindrical surface 12; radially outwardly by an upper surface 13 and by a lower surface 14, connecting the surface 13 to the face 11.

The surface 13 is concave, in particular of hemispherical shape, and comprises a lower area 15, on which a convex surface 16 of the body 4 is supported, and an upper area 17, which defines the outer shape of the thermal protection element 3 during the forming thereof.

Preferably, the convex shape of the surface 16 of the body 4 is complementary to that of the area 15.

Advantageously, the area 17 is coated with at least one layer (not shown) defined by so-called releasing material, i.e. a material having such characteristics as to prevent the adhesion of the ablative material to the surface 13. This releasing material, for example, includes PTFE.

The body 4 comprises a collar 18, which projects axially in such a way as to engage an annular space between the surfaces 12 and 14, in a position coaxial therewith.

With reference to FIG. 1 again, at the top, i.e. at the axial side opposite to the collar 18, the body 4 is delimited by a surface 20, which must be coated with ablative material to form the thermal protection element 3.

Before coupling the ablative material, the surface 20 is treated. For automatically performing the steps of surface treatment and the steps of coupling the ablative material, the station 1 provides a robot 22, for example of the anthropomorphic type with six degrees of freedom. The robot 22 ends with a multi-functional head 23, which supports a series of devices, shown in a schematic and simplified way in FIGS. 1 to 5, controlled to perform the operating steps required to produce the thermal protection element 3 on the surface 20 of the body 4 and on the area 17 of the surface 13.

These devices preferably comprise:
- a treatment device 24 (FIG. 1) for performing a cleaning and/or activation treatment on the surface 20;
- a deposition device 25 (FIG. 2), preferably of the spray type, for depositing a primer layer 26 on the surface 20 after the treatments mentioned above, and then for depositing a layer of adhesive 27 on the primer layer 26;
- a deposition device 28 (FIG. 3) for applying a web of ablative material 29 and forming a series of overlapped layers 30, above the adhesive layer 27; the set of layers 30, once vulcanized, will define the thermal protection element 3.

Figure 4:
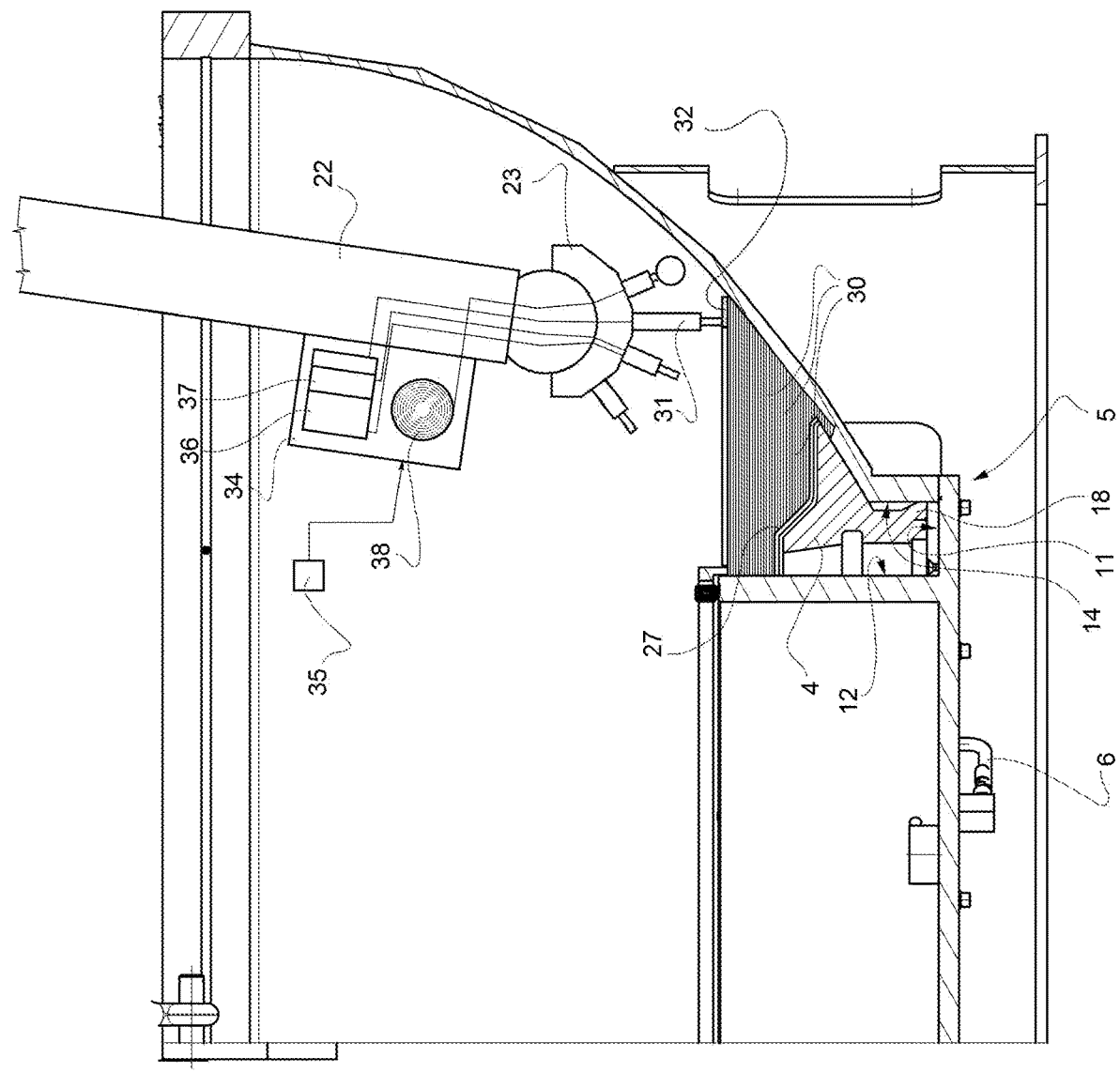
Figure 5:
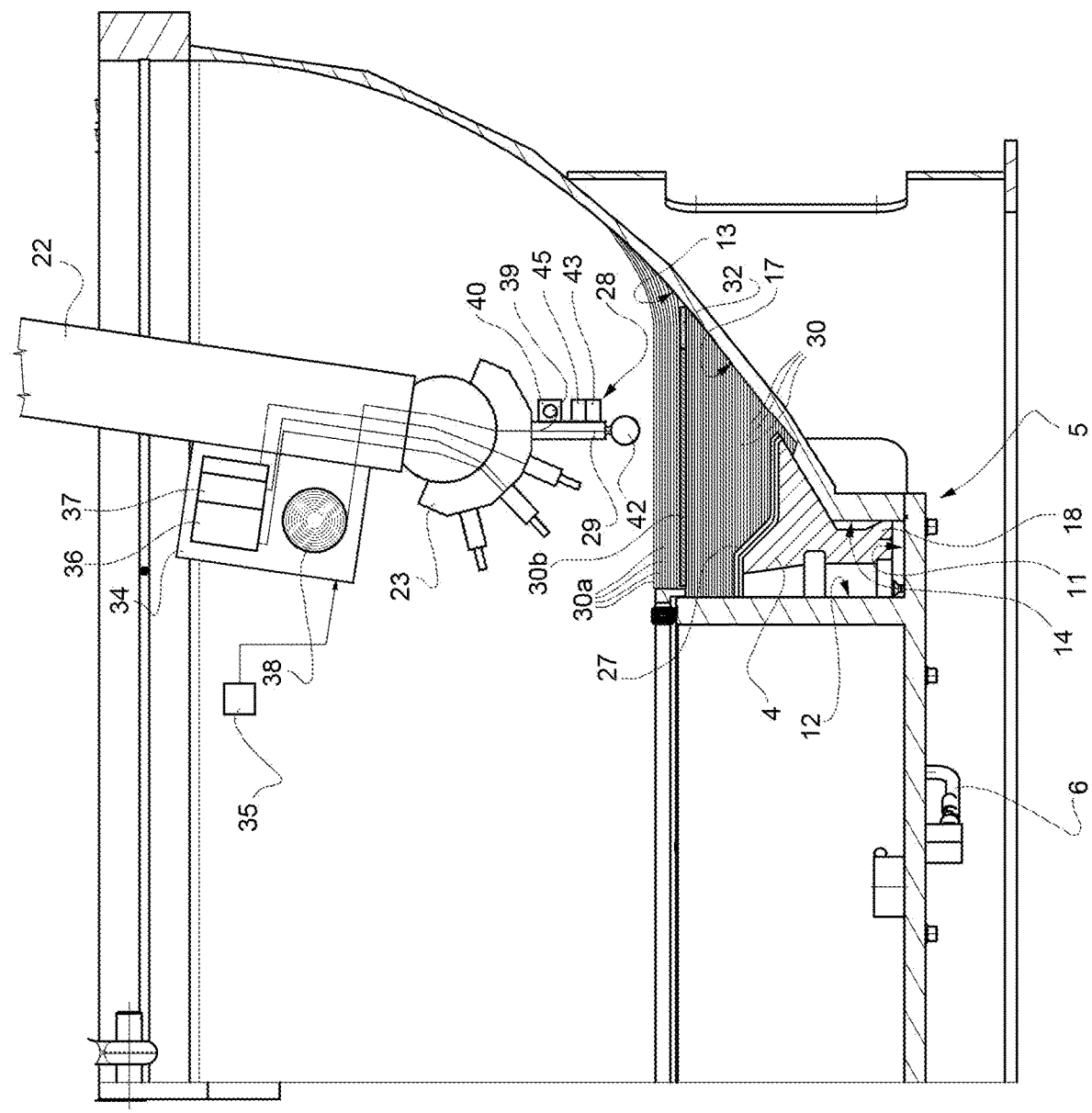

Preferably, as shown in FIG. 5, the device 28 is also used to deposit other layers of ablative material, indicated by the reference numeral 30a, which form as a whole, once vulcanized, a flap, generally called stress relief flap or floater, above the thermal protection element 3. The stress relief flap has an annular shape and, after vulcanization, remains attached to the thermal protection element 3 along an outer annular edge at a virtual hinge, defined by an annular element having an elastomer matrix (schematically shown), labeled with reference number 32 in FIGS. 4 and 5 and usually called floater insert.

Thanks to this virtual hinge, the stress relief flap formed by the layers 30a can axially move towards and away from the underlying thermal protection element 3, in particular to avoid stresses in the propellant during the consolidation thereof inside the casing.

Advantageously, among the devices supported by the head 23 a deposition device 31 (FIG. 4) is provided, for arranging the floater insert 32 on the layers 30. In particular, the device 31 can either perform only a positioning function, in order to arrange an already prepared extruded floater insert 32, or can also act as an extruder for forming the floater insert 32 directly during the positioning thereof.

Preferably, the device 28 is also used to deposit at least one layer 30b of so-called releasing material (FIG. 5) on the layers 30, in a radially more internal position with respect to the floater insert 32. The term "releasing material" means a material, which prevents the adhesion of the layers 30a to the layers 30, so as to allow the stress relief flap to move with respect to the thermal protection element 3. The releasing material comprises, for example, PTFE.

According to aspects of the present disclosure, the function of the head 23 can be configured, as it has such constructive characteristics as to selectively arrange, especially automatically, any of the devices 24, 25, 28, 31 in a working position facing towards the seat 8 of the mold 5, in order to perform the corresponding operative step, as required by the method that will be described below, in order to minimize the dead time between two subsequent steps.

According to not shown variants, the robot 22 carries only some of the devices 24, 25, 28, 31; and the devices 24, 25, 28, 31 may be carried by two or more robots operating in a synchronized manner.

Figure 2:
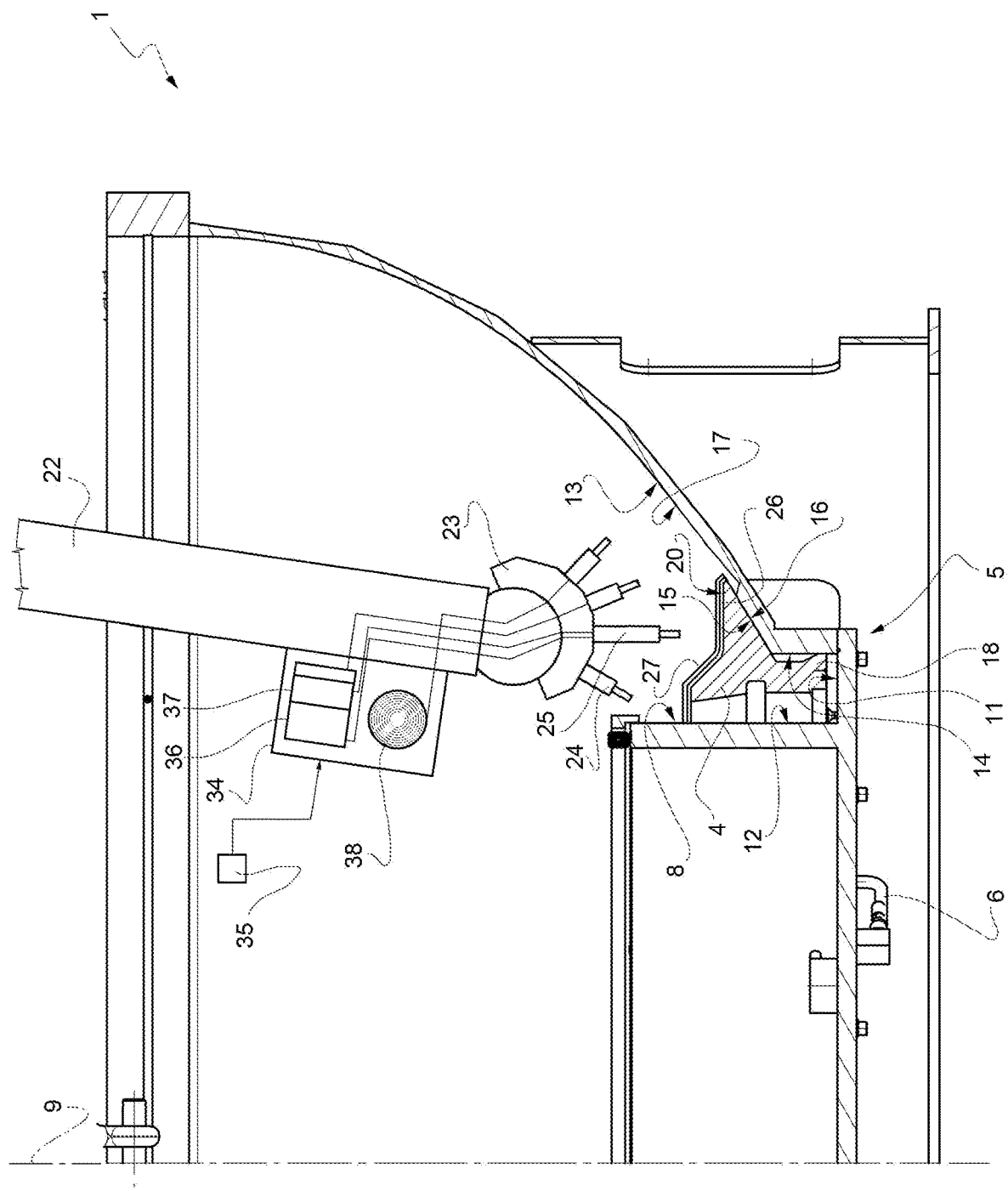
FIGS. 2 to 5 are similar to FIG. 1 and show, in enlarged scale, other operating steps of the method of the present disclosure.

According to an aspect of the present disclosure, with reference to FIGS. 1 and 2, the device 24 is defined by an atmospheric-pressure plasma treatment device, which performs not only a cleaning treatment, but also an activation treatment on the surface 20, in order to increase the wettability of the surface 20 and then the adhesion capacity of the primer layer 26.

As mentioned above, the device 25 is preferably defined by a spray dispensing system, which allows to dose accurately and automatically the quantity of primer and adhesive deposited on the surface 20 and, therefore, to determine accurately the thickness of the layers 26 and 27, without the need for a subsequent manual checking.

With reference to FIG. 2 again, the robot 22 preferably comprises a support device 34 for carrying on board at least some of the raw materials to be applied during the execution of the method. In particular, the device 34 carries all the raw material, that is: the web 29; the primer to form the layer 26; the adhesive to form the layer 27; the floater insert 32 (or the material required to extrude the floater insert 32); and the (releasing) material to form the layer 30b. By storing on the robot 22 at least part of the raw materials the machine downtimes are minimized and the systems which feed the raw materials to the head 23 are simplified.

The device 34 is preferably defined by a container housing the raw materials. Even more preferably, the internal environment of this container is regulated automatically by a control and conditioning system 35 (schematically illustrated), comprising one or more processors and associated memory, also carried on board the robot 22, or provided on the ground and connected to the internal environment of the device 34. The system 35 is so configured as to maintain the temperature and/or humidity of this environment within preset limits, in order to preserve the raw materials in an optimal manner over time.

FIGS. 2 to 5 only partially and schematically show how the raw materials are stored on the device 34. For example, the primer and the adhesive are stored in liquid form in respective tanks 36 and 37, connected to the device 25.

Figure 3:
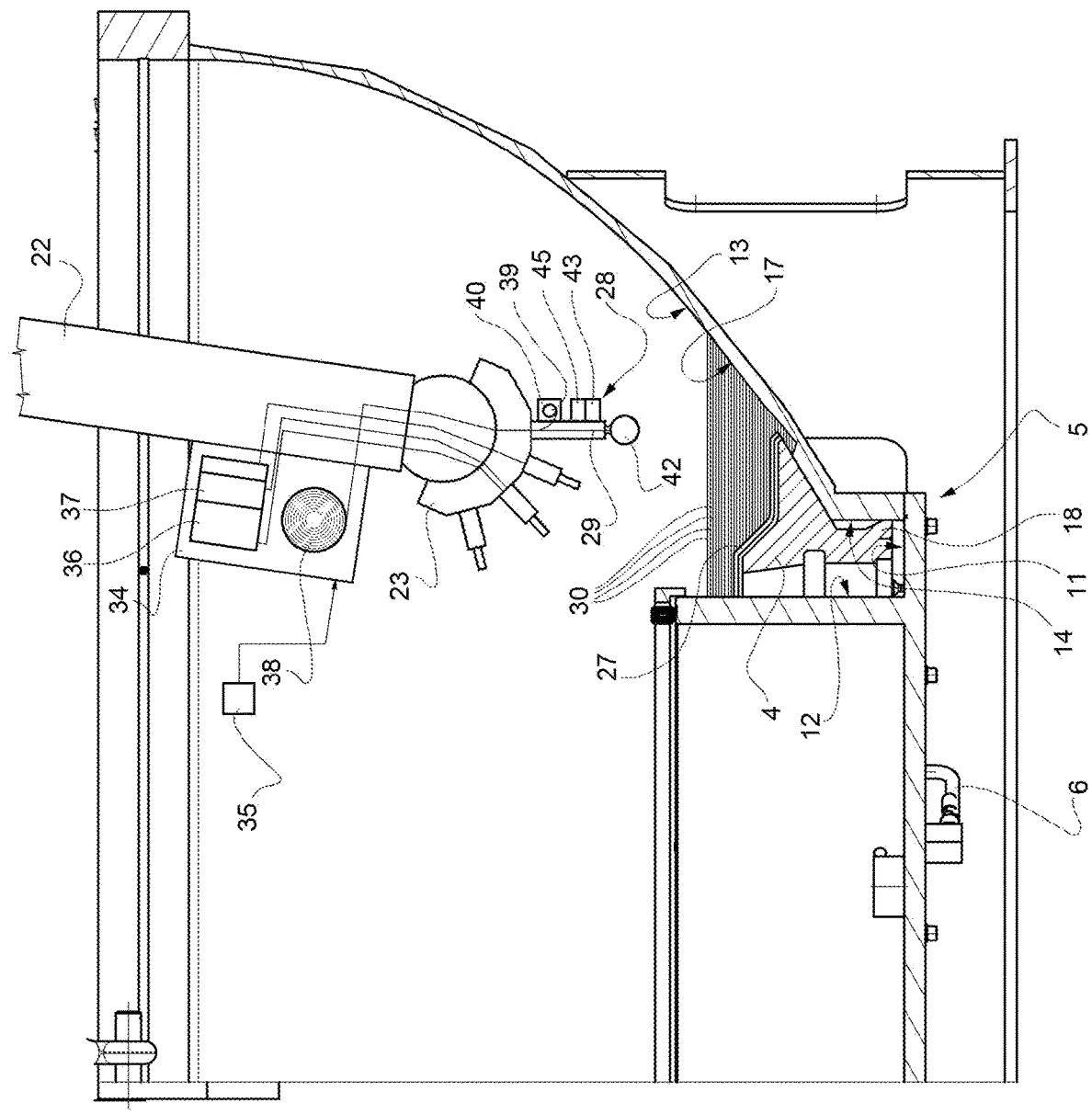

Preferably, the web 29 is stored in form of one or more reels 38. With reference to FIGS. 3 and 5, the web 29 is coupled to a support layer 39, for example a fabric, so as to form a multi-layer web wound to form the reels 38. The material of the support layer is of the so-called releasing type, i.e. it does not adhere permanently to the ablative material of the web 29.

The device 28 comprises a separation system 40, to which the web is fed from the reels 38. The system 40 automatically detaches and/or removes the web 29 from the support layer 39 during feeding through the device 28. In particular, the support layer 39 is rewound or discharged after detachment.

Preferably, the device 28 also comprises an application system 42 with rollers, which deposit the web 29. The rollers of the system 42 are controlled in such a way as to keep the web 29 tensioned during the application thereof, in particular with a tension level adjusted so as to prevent transverse necking of the web 29 before and/or during the deposition thereof. The tension of the web 29 provides a certain degree of compaction to the ablative material above the surface 20, directly during deposition.

Moreover, the rollers of the system 42 are movable with respect to the head 23 so as to adapt their position, automatically or in a motorized manner, according to the curvature of the surfaces, on which the web 29 is deposited and/or according to the orientation of the path to follow during the deposition of the web 29.

According an aspect of the present disclosure, the device 28 further comprises a heating system 43, for example of the electrical resistor type, which heats the web 29 just before the deposition in the mold 5, so as to slightly soften the ablative material, in order to make the web 29 more flexible and to promote the adhesion between the various superimposed layers 30.

Preferably, the conditions of tension and/or temperature of the web 29 are monitored and adjusted automatically by a control system (not shown) so as to optimize the deposition of the ablative material.

The device 28 further comprises at least one motorized cutting member 45 so actuated as to cut the web 29 without manual intervention, when all the required layers 30 have been deposited.

The method for producing the dome-shaped element 2 is performed as follows. First of all, the body 4 is produced outside the station 1, and is then installed in the seat 8 of the mold 5. The surface 20 of the body 4 is atmospheric-pressure plasma treated (FIG. 1), so as to clean and activate the surface 20 by means of device 24. After activation of the surface 20, the primer and then the adhesive are deposited (FIG. 2), in particular by performing an automatic control of the quantities sprayed by the device 25. Advantageously, as shown in the accompanying figures, the surface treatment and the spray depositions are performed after having placed the body 4 in the mold 5.

According to a variant not shown, it may be sufficient to deposit a layer of a single agent, to fix the ablative material to the surface 20, instead of the two layers 26 and 27.

The web 29 (FIG. 3) is then applied to form the layers 30, preferably after having heated the ablative material in order to improve the stratification thereof. In fact, heating improves the adhesion between the various layers 30, which are overlapped, and the better adhesion reduces air bubbles and spaces between the layers.

Once this first stratification step has been completed, the floater insert 32 is positioned on the upper surface of the set of layers 30 (FIG. 4). Preferably, the floater insert 32 is released by means of the device 31 automatically in the project position. Moreover, also the layer 30b is deposited on the layers 30, in particular by means of the device 28 in a manner not illustrated.

The layers 30a of ablative material are then deposited, above the floater insert 32 and the layer 30b (FIG. 5), to form the stress relief flap on the thermal protection element 3. As mentioned above, the layers 30a are deposited by means of the device 28, preferably after having heated the ablative material of the web 29.

Once the deposition of the ablative material is finished, the head 23 is removed, a vacuum bag (not shown) is arranged above the outer surface of the set of layers 30a and the vacuum pump 7 is then activated in order to depressurize the mold 5, thus compacting the various layers 30. Lastly, vulcanization is carried out, preferably under vacuum.

The dome-shaped element 2 thus obtained is extracted from the mold 5 and, as shown in FIG. 6, is mounted on an axial end of a mandrel 50. A similar dome-shaped element (not shown) is then mounted on the opposite axial end, indicated by the reference number 51, while a central cylindrical portion 52 of the mandrel 50 is covered by another ablative material so as to form a cylindrical sleeve and to complete the thermal protection. The set described above is subjected to a further vulcanization step for consolidating the various parts of ablative material and then forming the thermal protection coating, on which the outer casing of the rocket engine will be then formed, in a known and not shown manner.

In view of the above description, it is clearly apparent that the use of the plasma treatment is particularly advantageous, as it allows to clean the surface 20 deeply, as well as to activate the surface 20, so as to optimize the adhesion of the primer and the adhesive to the body 4. Moreover, this surface treatment has a relatively short duration (a few seconds) and can be carried out directly in the mold 5, differently from the known sand-blasting procedures.

The automatic spraying of the primer and the adhesive, immediately after the activation of the surface 20, allows to further reduce the times with respect to manual brush application, to further optimize adhesion and, therefore, to have a better final product. Moreover, it is possible to avoid manual checks on the thickness of the layers 26 and 27, as what is controlled is the dosage of the raw material and the number of coats while spraying.

It is therefore evident that the above described method is extremely fast and effective, as it comprises an automatic deposition of the raw materials, in particular the automatic deposition of the ablative material in form of web 29.

Also heating of the ablative material before and/or during the deposition improves the quality and reduces the production times, thanks to a more precise stratification, adherence and compaction of the ablative material.

Thanks to a greater accuracy in the ablative material deposition, the final profile of the thermal protection element 3 adequately corresponds to what projected, with respect to the case of manual stratification, so that subsequent machining is reduced or eliminated.

Moreover, the automatic deposition of the floater insert 32 allows an accurate positioning, according to the project, without the need for subsequent operations.

Therefore, it is evident that the quality standards and the repeatability of the method are improved, the times are significantly reduced and a strict and automatic control of the parameters can be guaranteed as regards deposition, direction of the fibers contained in the web 29, cut accuracy etc.

Lastly, it is clearly apparent from the description above that modifications and variations can be made to the method described above with reference to the attached figures, without however departing from the scope of protection of the present disclosure as defined in the appended claims.

In particular, the station 1 could have a fixed storage arranged at the side of the robot 22 to carry the devices 24, 25, 28 and 31 with the relevant raw materials, while the robot 22 is configured so as to selectively couple any one of these devices on the head 23, and then perform the corresponding operating step.

Furthermore, it should be noted that some aspects described above relate to features which are independent, both structurally and functionally, of the plasma treatment, which is the subject matter of the appended independent claims, in particular: heating the web 29, spraying the primer and/or the adhesive, controlling the internal environment of the support device 34, automatically depositing the floater insert 32 and, in case, directly extruding it on board the robot 22, automatically controlling the profile and the thicknesses installed.

What is claimed is:

1. A method for producing a dome-shaped element provided with thermal protection for a solid propellant rocket engine; the method comprising the steps of:
   providing a coupling annular body;
   arranging said coupling annular body in a mold;
   treating a surface of said coupling annular body so as to clean and/or activate said surface;
   depositing at least an intermediate fixing layer onto the treated surface;
   applying ablative material to said intermediate fixing layer and to a side area of said mold, in form of subsequent layers;
   wherein the step of treating said surface comprises a treatment with atmospheric-pressure plasma.

2. The method of claim 1, wherein the plasma treatment is carried out after having arranged said coupling annular body in said mold.

3. The method of claim 2, wherein the plasma treatment is carried out by means of a movable head of a robot.

4. The method of claim 1, wherein the ablative material is applied in form of a web by means of a movable head of a robot.

5. The method of claim 4, wherein said web is stored in form of one or more reels, carried by said robot.

6. The method of claim 1, comprising the step of heating the ablative material before and/or during the application onto said fixing intermediate layer.

7. The method of claim 1, wherein said fixing intermediate layer is deposited by spraying.

8. The method of claim 7, wherein said fixing intermediate layer is deposited by means of a movable head of a robot and is defined by at least one raw material contained in a tank carried by said robot.

* * * * *